United States Patent
Kumar et al.

(10) Patent No.: US 10,259,376 B2
(45) Date of Patent: Apr. 16, 2019

(54) VEHICLE EXTERIOR LIGHTING SYSTEMS

(71) Applicant: FORD GLOBAL TECHNOLOGIES, LLC, Dearborn, MI (US)

(72) Inventors: Arun Kumar, Farmington Hills, MI (US); Edward R. Golden, Pinckney, MI (US); Bruce Preston Williams, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/586,674

(22) Filed: May 4, 2017

(65) Prior Publication Data
US 2018/0319313 A1  Nov. 8, 2018

(51) Int. Cl.
| | |
|---|---|
| *B60Q 1/00* | (2006.01) |
| *F21V 8/00* | (2006.01) |
| *F21S 43/13* | (2018.01) |
| *F21S 43/14* | (2018.01) |
| *F21S 43/251* | (2018.01) |
| *F21S 43/241* | (2018.01) |
| *F21S 43/20* | (2018.01) |

(52) U.S. Cl.
CPC ............ *B60Q 1/0011* (2013.01); *F21S 43/13* (2018.01); *F21S 43/14* (2018.01); *F21S 43/241* (2018.01); *F21S 43/251* (2018.01); *F21S 43/26* (2018.01); *G02B 6/001* (2013.01)

(58) Field of Classification Search
None
See application file for complete search history.

(56) References Cited

U.S. PATENT DOCUMENTS

| | | | | |
|---|---|---|---|---|
| RE34,318 E | * | 7/1993 | Davenport | B60Q 1/0011 362/511 |
| 5,311,410 A | * | 5/1994 | Hsu | B60Q 1/0011 362/552 |
| 8,496,365 B2 | | 7/2013 | Singh et al. | |
| 8,939,621 B2 | | 1/2015 | Brown et al. | |
| 2008/0219020 A1 | * | 9/2008 | Miguel Sanz | B60Q 1/2665 362/509 |
| 2011/0260616 A1 | | 10/2011 | Chaterlea et al. | |
| 2014/0049983 A1 | * | 2/2014 | Nichol | G02B 6/0018 362/610 |
| 2016/0245471 A1 | * | 8/2016 | Nakazato | F21S 48/1195 |

FOREIGN PATENT DOCUMENTS

| | | |
|---|---|---|
| DE | 10214505 A1 | 10/2003 |
| DE | 102011016402 A1 | 10/2012 |
| DE | 202012012607 U1 | 7/2013 |
| DE | 102013009460 A1 | 12/2013 |
| JP | 2013232405 A | 11/2013 |
| KR | 100524274 B1 | 11/2005 |
| KR | 20070031632 A | 3/2007 |
| KR | 100923847 B1 | 10/2009 |

OTHER PUBLICATIONS

Fiber Optic Tail Lights, 521 Products, five pages, https://www.carid.com/fiber-optic-tail-lights-html, printed Feb. 8, 2017.

* cited by examiner

*Primary Examiner* — Ashok Patel
(74) *Attorney, Agent, or Firm* — Carlson, Gaskey & Olds

(57) ABSTRACT

A vehicle exterior lighting system includes, among other things, a lens assembly, a light diffusing fiber enclosed within the lens assembly, a light source connected to a first portion of the light diffusing fiber, and a prismatic device connected to a second portion of the light diffusing fiber.

19 Claims, 3 Drawing Sheets

VEHICLE EXTERIOR LIGHTING SYSTEMS

TECHNICAL FIELD

This disclosure relates to vehicle exterior lighting systems. An exemplary vehicle exterior lighting system includes a light diffusing glass fiber that can be illuminated for achieving both a parking light function and a side marker light function at the vehicle exterior.

BACKGROUND

Vehicle exterior lighting systems include a multitude of lighting and signaling devices for illuminating the vehicle and alerting other drivers/pedestrians to both the vehicle's presence and to the driving intentions of the vehicle. These lighting systems are typically required to include parking lights and side marker lights. The parking lights mark the position of the vehicle to the front and rear of the vehicle, whereas the side marker lights indicate the position of the vehicle to the sides of the vehicle. The functions of the parking lights and the side marker lights are most commonly achieved using some combination of lightbulbs and light-emitting diodes (LEDs).

SUMMARY

A vehicle exterior lighting system according to an exemplary aspect of the present disclosure includes, among other things, a lens assembly, a light diffusing fiber enclosed within the lens assembly, a light source connected to a first portion of the light diffusing fiber, and a prismatic device connected to a second portion of the light diffusing fiber.

In a further non-limiting embodiment of the foregoing vehicle exterior lighting system, the lens assembly includes a first lens section and a second lens section.

In a further non-limiting embodiment of either of the foregoing vehicle exterior lighting systems, at least a portion of each of the first lens section and the second lens section is clear or translucent.

In a further non-limiting embodiment of any of the foregoing vehicle exterior lighting systems, the light diffusing fiber is trapped between the first lens section and the second lens section.

In a further non-limiting embodiment of any of the foregoing vehicle exterior lighting systems, the light diffusing fiber is received within a groove formed in one of the first lens section and the second lens section.

In a further non-limiting embodiment of any of the foregoing vehicle exterior lighting systems, the light source is adapted to illuminate the light diffusing fiber for simultaneously creating both a parking light function and a side maker light function of the vehicle exterior lighting system.

In a further non-limiting embodiment of any of the foregoing vehicle exterior lighting systems, the light diffusing fiber establishes a geometric pattern within the lens assembly.

In a further non-limiting embodiment of any of the foregoing vehicle exterior lighting systems, the light diffusing fiber extends along a circuitous path inside the lens assembly.

In a further non-limiting embodiment of any of the foregoing vehicle exterior lighting systems, the light diffusing fiber includes a plurality of bends for establishing the circuitous path.

In a further non-limiting embodiment of any of the foregoing vehicle exterior lighting systems, the light source is a laser.

In a further non-limiting embodiment of any of the foregoing vehicle exterior lighting systems, the light source is a light emitting diode.

In a further non-limiting embodiment of any of the foregoing vehicle exterior lighting systems, the prismatic part is embedded within the lens assembly.

In a further non-limiting embodiment of any of the foregoing vehicle exterior lighting systems, the prismatic part is tinted.

In a further non-limiting embodiment of any of the foregoing vehicle exterior lighting systems, the prismatic part includes a textured surface.

In a further non-limiting embodiment of any of the foregoing vehicle exterior lighting systems, the light diffusing fiber is routed around a void space of the lens assembly to establish a geometry within the lens assembly.

A method according to another exemplary aspect of the present disclosure includes, among other things, illuminating a light diffusing fiber of a vehicle exterior lighting system to simultaneously create both a parking light function and a side maker light function at an exterior of the vehicle.

In a further non-limiting embodiment of the foregoing methods, the method includes, prior to illuminating the light diffusing fiber, enclosing the light diffusing fiber within a lens assembly.

In a further non-limiting embodiment of either of the foregoing methods, enclosing the light diffusing fiber includes positioning the light diffusing fiber at a geometric location of the lens assembly for achieving both the parking light function and the side marker light function.

In a further non-limiting embodiment of any of the foregoing methods, enclosing the light diffusing fiber includes arranging the light diffusing fiber to extend along a circuitous path.

In a further non-limiting embodiment of any of the foregoing methods, the method includes redirecting the light emitted by the light diffusing fiber with a prismatic device to create the side marker light function.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle exterior lighting systems for illuminating a vehicle exterior and alerting others of the vehicle's presence. An exemplary vehicle lighting system includes a lens assembly, a light diffusing fiber positioned inside the lens assembly, a light source at a first end portion of the light diffusing fiber for illuminating the light diffusing fiber, and a prismatic device at a second end portion of the light diffusing fiber for projecting the light outwardly from the lens assembly. The light diffusing fiber may be illuminated to simultaneously achieve both a parking light function and a side marker function of the vehicle lighting system. These and other features of this disclosure are described in greater detail below.

Figure 1:
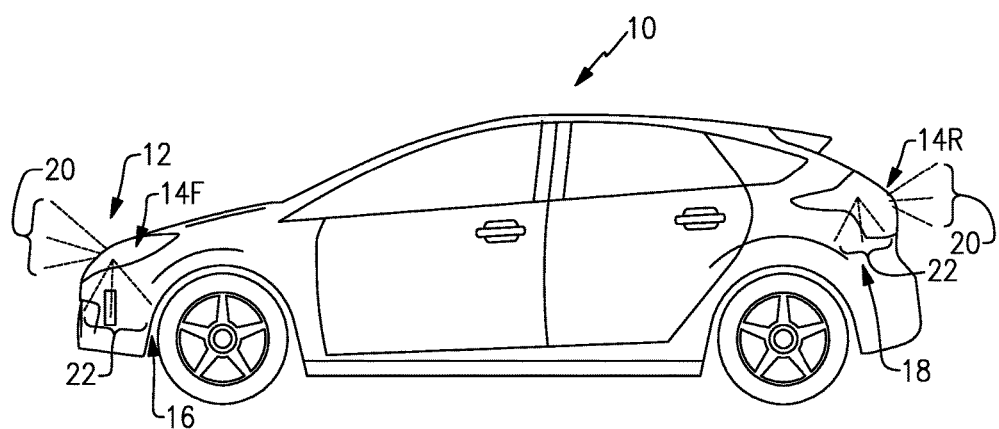
FIG. 1 illustrates a vehicle equipped with an exterior lighting system.

FIG. 1 illustrates a vehicle 10 including an exterior lighting system 12. The vehicle 10 of FIG. 1 is depicted as a car in this non-limiting embodiment. However, trucks, vans, or any other automotive vehicles could also benefit from the teachings of this disclosure. Moreover, although specific component relationships are illustrated in the figures of this disclosure, the illustrations are not intended to limit this disclosure. In other words, the placement and orientation of the various components of the exterior lighting system 12 of the vehicle 10 are shown schematically and could vary within the scope of this disclosure.

The exterior lighting system 12 may include one or more lighting assemblies 14F located at a front portion 16 of the vehicle 10, and one or more lighting assemblies 14R located at a rear portion 18 of the vehicle 10. Each lighting assembly 14F, 14R of the exterior lighting system 12 may include a multitude of lamps and signaling devices for illuminating the vehicle 10 and alerting other drivers and/or pedestrians of the vehicle's 10 presence and to the driving intentions of the vehicle 10. In an embodiment, each lighting assembly 14F, 14R is capable of achieving both a parking light function 20 and a side marker light function 22 of the exterior lighting system 12. As shown schematically, for example, the parking light function 20 marks the position of the vehicle 10 to the front and rear of the vehicle 10 when the lighting assemblies 14F, 14R are illuminated, and the side marker light function 22 indicates the position of the vehicle 10 to the sides of the vehicle 10 when the lighting assemblies 14F, 14R are illuminated.

Figure 2:
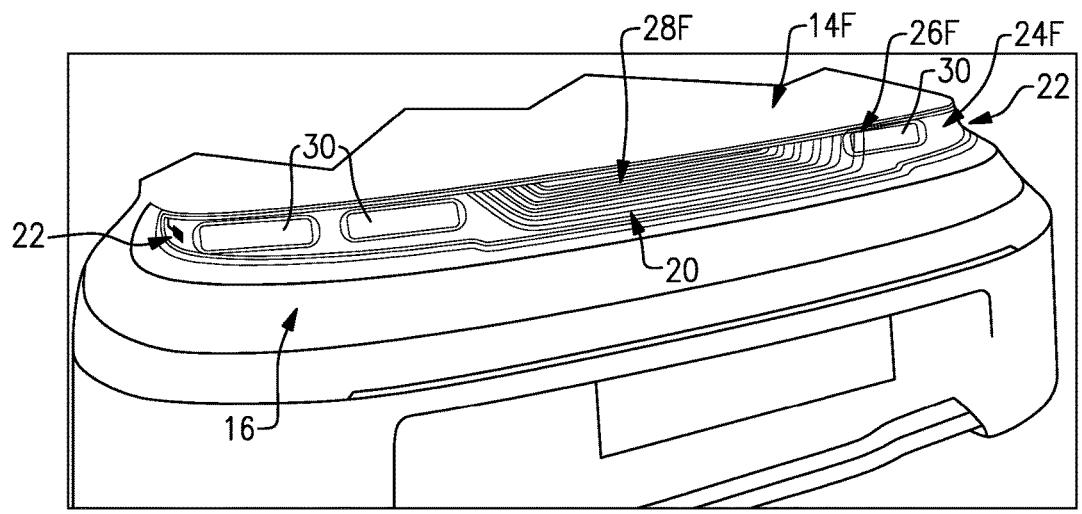
FIG. 2 illustrates a front lighting assembly of the vehicle of FIG. 1.

FIG. 2 illustrates the lighting assembly 14F of FIG. 1 in greater detail. The lighting assembly 14F is located at the front portion 16 of the vehicle 10 and therefore may be referred to as a front lighting assembly of the exterior lighting system 12.

In an embodiment, the lighting assembly 14F includes a lens assembly 24F and one or more light diffusing fibers 26F housed within the lens assembly 24F. The light diffusing fibers 26F may be relatively thin, flexible glass optical fiber strands that are capable of emitting continuous, uniform light as that light travels through a core of the fiber.

The light diffusing fiber 26F may be embedded or otherwise enclosed within the lens assembly 24F to create a geometrical pattern 28F that is unique to the design of the vehicle 10. The specific geometrical pattern 28F shown in FIG. 2 is exemplary and not intended to limit this disclosure. The light diffusing fiber 26F may then be illuminated to create a uniformly lit appearance at the front portion 16 of the vehicle 10.

In an embodiment, the light diffusing fiber 26F can be arranged within the lens assembly 24F and illuminated to simultaneously create both the parking light function 20 and the side marker light function 22. The light diffusing fiber 26F may be illuminated in a first color, such as white or amber, to create the parking light function 20 and the side marker light function 22 at the front portion 16 of the vehicle 10. The areas of the lighting assembly 14F that may be illuminated using the light diffusing fiber(s) 26F include to the right and left of headlights 30 and between the headlights 30.

Figure 3:
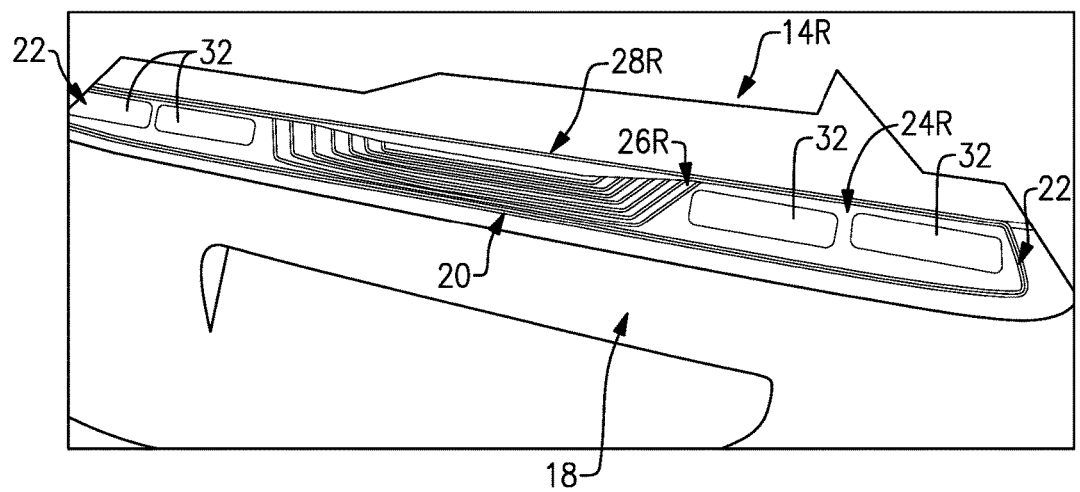
FIG. 3 illustrates a rear lighting assembly of the vehicle of FIG. 1.

FIG. 3 illustrates the lighting assembly 14R of FIG. 1 in greater detail. The lighting assembly 14R is located at the rear portion 18 of the vehicle 10 and therefore may be referred to as a rear lighting assembly of the exterior lighting system 12.

The lighting assembly 14R may include a lens assembly 24R and one or more light diffusing fibers 26R housed within the lens assembly 24R. The light diffusing fibers 26R may be embedded or otherwise enclosed within the lens assembly 24R to create a geometrical pattern 28R that is unique to the design of the vehicle 10. The specific geometrical pattern 28R shown in FIG. 3 is exemplary and not intended to limit this disclosure. The light diffusing fiber 26R may then be illuminated to create a uniformly lit appearance at the rear portion 18 of the vehicle 10.

In an embodiment, the light diffusing fiber 26R can be arranged within the lens assembly 24R and illuminated to simultaneously create both the parking light function 20 and the side marker light function 22. The light diffusing fiber 26R may be illuminated in a second color, such as red, to create the parking light function 20 and the side marker light function 22 at the rear portion 18 of the vehicle 10. The areas of the lighting assembly 14R that may be illuminated using the light diffusing fiber(s) 26R include to the right and left of taillights 32 and between the taillights 32.

Figure 4:
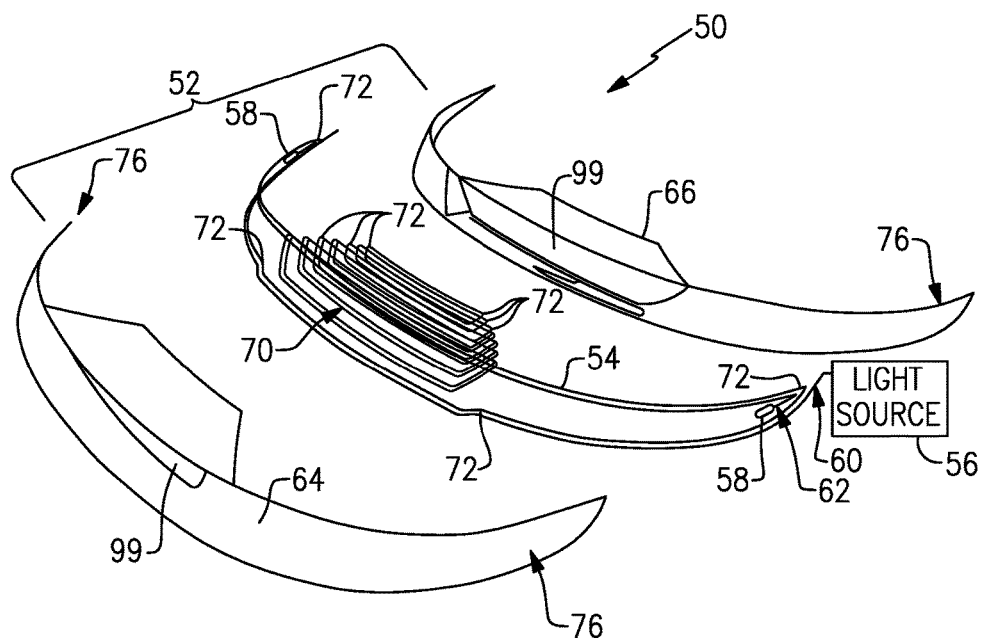
FIG. 4 is an exploded view of an exemplary vehicle lighting assembly.

FIG. 4 is an exploded view of an exemplary vehicle lighting assembly 50. The vehicle lighting assembly 50 may be utilized as either a front lighting assembly (similar to that shown in FIG. 2) or a rear lighting assembly (similar to that shown in FIG. 3) of a vehicle, such as the vehicle 10 of FIG. 1, for example.

The vehicle lighting assembly 50 includes a lens assembly 52, a light diffusing fiber 54, a light source 56, and a prismatic device 58. The light source 56 is connected at a first end portion 60 of the light diffusing fiber 54, and the prismatic device 58 is connected at a second end portion 62 of the light diffusing fiber 54. The light diffusing fiber 54 can be illuminated to simultaneously create both a parking light function and a side marker light function at a vehicle exterior that is equipped with the vehicle lighting assembly 50.

The lens assembly 52 may include a first lens section 64 and a second lens section 66. In an embodiment, the first lens section 64 and the second lens section 66 are made of plastic materials and are at least partially clear or translucent. This permits light from the light diffusing fiber 54 to emit through the lens assembly 52. The size and shape of each lens section 64, 66 is vehicle dependent and is not intended to limit this disclosure.

Figure 5:
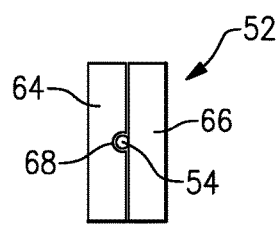
FIG. 5 illustrates portions of a lens assembly of the vehicle lighting assembly of FIG. 4.

The light diffusing fiber 54 may be embedded or otherwise enclosed within the lens assembly 52 to create the unique effect of thin, precision lines that are suspended/floating in a medium. In an embodiment, the light diffusing fiber 54 is trapped between the first lens section 64 and the second lens section 66. In another embodiment, the light diffusing fiber 54 is laminated between the first lens section 64 and the second lens section 66. In yet another embodiment, one of the first and second lens sections 64, 66 includes a groove 68 that receives the light diffusing fiber 54 (see, e.g., FIG. 5). The other of the first and second lens sections 64, 66 may then be attached to or injected over the lens section 64, 66 that includes the groove 68 to encase the light diffusing fiber 54 within the lens assembly 52.

In another embodiment, the light diffusing fiber 54 is positioned to take advantage of void spaces 99 of the first lens section 64 and the second lens section 66. The light diffusing fiber 54 can be routed around these void spaces 99 to create a geometry unique to the vehicle 10. The light diffusing fiber 54 can additionally be routed around and away from primary vehicle lighting elements (i.e., low beam, high beam, turn, stop, etc.) so as not to impede their functions.

The light diffusing fiber 54 is arranged in the correct geometric space of the lens assembly 52 for creating both the parking light and side marker light functions of an exterior lighting system. The light diffusing fiber 54 may be arranged to extend along a circuitous path 70 within the lens assembly 52. A plurality of bends 72 may be formed in the light diffusing fiber 54 to create the circuitous path 70.

Light generated by the light source 56 may travel through a core of the light diffusing fiber 54 for uniformly illuminating the light diffusing fiber 54. In an embodiment, the light source 56 is a laser. In another embodiment, the light source 56 is an LED. Other light sources could also be utilized within the scope of this disclosure. The light source 56 may be mounted at any non-visual location of the vehicle lighting assembly 50.

The prismatic device 58 may be embedded within the lens assembly 52, such as between the first and second lens sections 64, 66. In an embodiment, the vehicle lighting assembly 50 includes at least two prismatic devices 58 for providing the side marker light function at both sides of the vehicle. The prismatic devices 58 may be arranged in the correct geometric spaces of the lens assembly 52 for creating the side marker light function, for example, within the outer peripheral regions 76 of each lens section 64, 66. In an embodiment, each prismatic device 58 is a plastic, prismatic part fitted to the second end portions 62 of the light diffusing fiber 54 for capturing the light that escapes from the second end portions 62 and directing the light for creating the side marker light function.

Figure 6:
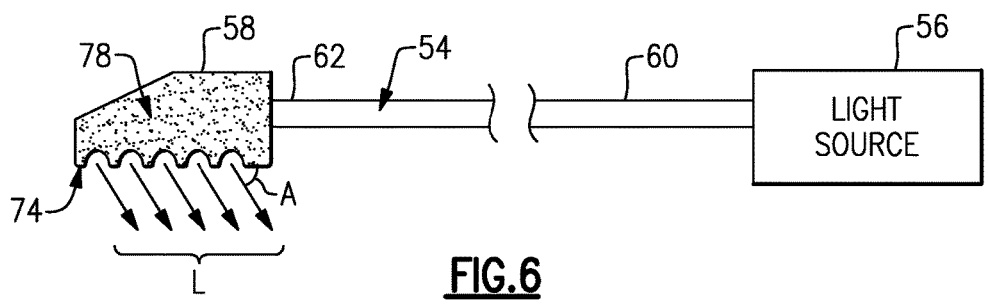
FIG. 6 schematically illustrates portions of the vehicle lighting assembly of FIG. 4.

Referring now primarily to FIG. 6, the prismatic device 58 includes a geometry for redirecting the light L that exits from the light diffusing fiber 54 at an angle A that is necessary for achieving the side marker light function. The specific angle of the angle A is vehicle dependent and is not intended to limit this disclosure. In an embodiment, the prismatic device 58 includes a textured surface 74 which aids in projecting the light L from the prismatic device 58.

The prismatic device 58 may additionally be adapted to alter a color of the light L emitted by the light diffusing fiber 54. For example, the prismatic device 58 may be tinted (shown schematically at 78) to alter the color of the light L that projects from the prismatic device 58. In an embodiment, the light L from the light source 56 is white or amber and is changed to a different color, such as red, as the light L passes through the prismatic device 58.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle exterior lighting system, comprising:
   a lens assembly;
   a light diffusing fiber enclosed within the lens assembly and establishing a geometric pattern within the lens assembly,
   wherein the light diffusing fiber is trapped between a first lens section and a second lens section of the lens assembly;
   a light source connected to a first portion of the light diffusing fiber; and
   a prismatic device connected to a second portion of the light diffusing fiber.

2. The vehicle exterior lighting system as recited in claim 1, wherein the light diffusing fiber is routed around a void space of the lens assembly to establish a geometry within the lens assembly.

3. The vehicle exterior lighting system as recited in claim 1, wherein at least a portion of each of the first lens section and the second lens section is clear or translucent.

4. The vehicle exterior lighting system as recited in claim 1, wherein an entire length of the light diffusing fiber is enclosed within the lens assembly.

5. The vehicle exterior lighting system as recited in claim 1, wherein the light diffusing fiber is received within a groove formed in one of the first lens section and the second lens section.

6. The vehicle exterior lighting system as recited in claim 1, wherein the light source is adapted to illuminate the light diffusing fiber for simultaneously creating both a parking light function and a side maker light function of the vehicle exterior lighting system.

7. The vehicle exterior lighting system as recited in claim 1, wherein the prismatic device includes a textured surface.

8. The vehicle exterior lighting system as recited in claim 1, wherein the light diffusing fiber extends along a circuitous path inside the lens assembly.

9. The vehicle exterior lighting system as recited in claim 8, wherein the light diffusing fiber includes a plurality of bends for establishing the circuitous path.

10. The vehicle exterior lighting system as recited in claim 1, wherein the light source is a laser.

11. The vehicle exterior lighting system as recited in claim 1, wherein the light source is a light emitting diode.

12. The vehicle exterior lighting system as recited in claim 1, wherein the prismatic device is embedded within the lens assembly.

13. The vehicle exterior lighting system as recited in claim 1, wherein the prismatic device is tinted.

14. A vehicle lighting method, comprising:
    illuminating a light diffusing fiber of a vehicle exterior lighting system to simultaneously create both a parking light function and a side maker light function at an exterior of the vehicle, wherein the light diffusing fiber is trapped between a first lens section and a second lens section of a lens assembly of the vehicle exterior lighting system.

15. The method as recited in claim 14, comprising, prior to illuminating the light diffusing fiber, enclosing the light diffusing fiber within the lens assembly.

16. The method as recited in claim 15, wherein enclosing the light diffusing fiber includes positioning the light diffusing fiber at a geometric location of the lens assembly for achieving both the parking light function and the side marker light function.

17. The method as recited in claim 15, wherein enclosing the light diffusing fiber includes arranging the light diffusing fiber to extend along a circuitous path.

18. The method as recited in claim 14, comprising redirecting the light emitted by the light diffusing fiber with a prismatic device to create the side marker light function.

19. A vehicle lighting system, comprising:
   a lens assembly;
   a light diffusing fiber trapped between a first lens and a second lens of the lens assembly;
   a first portion of the light diffusing fiber arranged in a first geometric space of the lens assembly for providing a parking light; and
   a second portion of the light diffusing fiber arranged in a second, different geometric space of the lens assembly for providing a side marker light.

* * * * *